United States Patent [19]

Taylor

[11] 4,056,499

[45] * Nov. 1, 1977

[54] DEGRADABLE POLYMERIC COMPOSITION

[75] Inventor: Lynn J. Taylor, Haslett, Mich.

[73] Assignee: Owens-Illinois, Inc., Toledo, Ohio

[ * ] Notice: The portion of the term of this patent subsequent to Mar. 16, 1993, has been disclaimed.

[21] Appl. No.: 206,133

[22] Filed: Dec. 8, 1971

[51] Int. Cl.$^2$ ............................................. C08J 3/20
[52] U.S. Cl. ............................ 260/23 H; 204/159.14; 260/DIG. 43; 526/30; 526/46; 526/49; 526/50; 526/55; 528/487; 528/492; 528/493; 528/494; 528/497; 536/63; 536/64; 536/65; 536/85
[58] Field of Search ............... 260/DIG. 43, 94.9 GC, 260/45.7 R, 92.8 A, 93.5 A, 93.7, 49.9 GD, 96 R, 94.9 GB, 23 H; 204/159.14; 526/914, 30, 46, 49, 50, 55; 528/487, 492, 493, 494, 497; 536/63, 64, 65, 85

[56] References Cited

U.S. PATENT DOCUMENTS

| | | | |
|---|---|---|---|
| 2,616,880 | 11/1962 | Seymour | 260/92.8 A |
| 2,616,881 | 11/1952 | Seymour | 260/92.8 A |
| 2,616,884 | 11/1952 | Marous | 260/92.8 A |
| 2,616,886 | 11/1952 | Danzig | 260/92.8 A |
| 2,616,887 | 11/1952 | Danzig et al. | 260/92.8 A |
| 2,736,723 | 2/1956 | Breuer et al. | 260/93.5 A |
| 3,188,165 | 6/1965 | Magat et al. | 204/159.14 |
| 3,205,206 | 9/1965 | Marcantonoi | 260/94.9 GB |
| 3,300,462 | 1/1967 | Milan et al. | 260/DIG. 43 |
| 3,301,837 | 1/1967 | Bartorelli et al. | 260/94.9 GB |
| 3,328,362 | 6/1967 | Roberts et al. | 260/93.5 A |
| 3,382,226 | 5/1968 | Landis | 260/93.5 A |
| 3,515,687 | 7/1967 | Listner | 260/93.5 A |
| 3,723,405 | 3/1973 | Kaplan et al. | 260/94.9 GB |
| 3,779,963 | 12/1973 | Ancker et al. | 526/22 |
| 3,944,511 | 3/1976 | Taylor | 260/23 H |

OTHER PUBLICATIONS

Polymer Preprints, vol. 12, No. 2, Sept. 1971, pp. 81–90.

*Primary Examiner*—Eugene C. Rzucidlo
*Attorney, Agent, or Firm*—Donald K. Wedding

[57] ABSTRACT

There is disclosed the preparation of a gradable polymeric composition by the chemical modification of a polymeric material such as a polymer or copolymer. The preparation comprises reacting in the presence of free radicals the polymeric material with a non-polymeric organic reagent having a structure which contains both a hydrocarbon residue and a polymeric material-degradation-sensitizing group.

18 Claims, No Drawings

DEGRADABLE POLYMERIC COMPOSITION

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One approach to the alleviation of the problem of plastics waste and litter would involve the development of novel polymeric compositions which undergo accelerated degradation under environmental conditions. This general approach has been described in the prior art. For example, reference is made to British Pat. Specification No. 1,128,793, which describes ethylenecarbon monoxide copolymers which undergo rapid deterioration when subjected to sunlight.

The present invention resembles the prior art in that the degradability of polymeric materials is altered by the introduction of suitable degradation-sensitizing groups, but differs in that these groups are introduced via chemical modification of a previously synthesized polymeric material, rather than during the polymerization process.

DESCRIPTION OF THE INVENTION

In accordance with this invention, a modified polymeric material is prepared by the reaction of an organic polymeric material and a nonpolymeric organic reagent referred to hereinafter as R-X, which reagent structure contains both an aliphatic hydrocarbon residue (R) and at least one polymeric material-degradation-sensitizing functional group (X).

More particularly, the reaction of the polymeric material and R-X is conducted by subjecting a mixture of the two materials, optionally in the presence of catalzying or like additives, to conditions which promote the formation of free radicals. It is believed that free radicals are derived from the polymer and from R-X and that chemical bonding between the polymer and R-X ensues as a result of radical-radical recombination reactions.

Typical organic polymers (and copolymers) contemplated especially include polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(caprolactam), poly(hexamethyleneadipamide), poly(ethylene terephthalate), vinyl chloridevinyl acetate copolymers, styrene-butadiene copolymers, styrene-isoprene copolymers, cellulose (including paper and paper-board), cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The aliphatic hydrocarbon residue (R) of reagent R-X is a linear, branched or cyclic, saturated or unsaturated, aliphatic group containing at least six carbon atoms.

The degradation-sensitizing group X of reagent R-X is an organic group which is capable of promoting polymer degradation under environmental conditions, by virtue of its reactivity in the presence of heat, light, oxygen, moisture, and/or microorganisms. Typical examples of such groups include acyl groups, aroyl groups, aldehyde groups, ether groups, acyl halide groups, arylazo groups, quinone groups, sulfide groups, disulfide groups, thiol groups, halogen atoms, phenyl and substituted phenyl groups, naphthyl and substituted naphthyl groups, and substituted or unsubstituted heterocyclic groups such as thiazole, benzothiazole, benzimidazole, or carbazole groups.

It should be understood that the free-radical reaction between the polymer and reagent R-X may result in the alteration of the detailed structure of group X; for example, an aldehyde group may be converted to a ketone group in the course of the reaction.

It should be understood that more than one group of type R and/or more than one group of type X may be present per molecule of reagent R-X. If group X possesses more than one valence, it may also be attached to other organic groups, such as alkyl or aryl groups. Furthermore, it should be understood that a mixture of two or more reagents of type R-X may be employed.

Specific examples of compounds of type R-X include the following:

KETONES

Laurophenone
n-Decanophenone
Di-n-heptyl ketone
2-Dodecanone
2-Octadecanone

ALDEHYDES

Lauraldehyde
Undecylenic aldehyde
p-n-Octyloxybenzaldehyde

SULFUR COMPOUNDS n-Decyl mercaptan
Lauryl mercaptan
Stearyl mercaptan
Dilauryl Sulfide
Dilauryl Disulfide
Distearyl Disulfide Di-n-Octyl Disulfide

NITRO COMPOUNDS p-Nitrophenyl Caprylate
p-Nitrophenyl Laurate

HALOGENATED COMPOUNDS

Lauryl Bromide
Lauryl Chloride
Stearyl Bromide
Stearyl Chloride
Oleoyl Chloride
Lauroly Chloride
Stearoyl Chloride
Dodecenyl Chloride

ETHERS

Cetyl vinyl ether
n-Dodecyl phenyl ether
Lauryl vinyl ether
Dilauryl ether

AMINES

Stearyl diphenylamine
N-Stearylmorpholine

AROMATIC COMPOUNDS

1-Decylnaphthalene
n-Dodecylbenzene
n-Decylbenzene
1-octylnaphthalene

In one preferred embodiment of this invention, a mixture of an organic polymer, a reagent of type R-X, and a free-radical initiator, such as an organic peroxide, hydroperoxide, or azo compound, is heated to a temperature sufficient to induce the formation of free radicals. It is contemplated that in such embodiment the reactive composition will ordinarily contain about 60 to 98% by weight of polymer, about 1 to 30% by weight of reagent R-X, and about 1 to 20% by weight of the radical initiator or combination of initiators.

In a second specific embodiment, a mixture of an organic polymer and a reagent of type R-X is subjected to actinic radiation, preferably in the presence of a photosensitizing additive, such as an organic ketone, quinone, or dye. If X is a suitable photosensitizing group, the photosensitizing additive may be omitted. In this embodiment, it is contemplated that the reactive composition will ordinarily contain about 60-99% by weight of the polymer, about 1 to 30% by weight of reagent R-X, and if required, a small effective amount up to about 10% by weight of a photosensitizing additive.

In a third specific embodiment, a mixture containing about 70 to 99% by weight of an organic polymer and about 1 to 30% of a reagent of type R-X is subjected to ionizing radiation.

Additional materials, such as fillers, pigments, dyes, plasticizers foaming agents, reinforcing agents, etc., may also be present during the reaction, or may be added subsequently. It should be understood that such additives are not to be considered in calculating the percentages of polymer, co-reactant, and initiator or photosensitizer, as specified above.

In the practice of this invention, the reaction may be conducted in a conventional vessel, such as a chemical reactor, and the polymeric product may subsequently be fabricated by conventional means, such as molding, extrusion, calendering, solution casting, etc.

Alternatively, the reactive composition may be prepared and fabricated as a film, coating, adhesive, three-dimensional article, etc., and the chemical reaction conducted subsequently, in situ, by heating, exposure to ultraviolet or ionizing radiation, etc.

I claim:

1. A process for degrading a polymeric composition, which process comprises reacting the polymeric material in the presence of a source of free radicals with a non-polymeric organic reagent R-X, wherein R is at least one aliphatic hydrocarbon group containing at least six carbon atoms and X is at least one polymeric material-degradation-sensitizing group, to produce said degradable polymeric composition, and subsequently exposing said composition to at least one natural environmental condition sufficient to degrade said composition.

2. The process of claim 1 wherein the polymeric material is selected from the group consisting of polypropylene, poly(4-methyl-1-pentene), polystyrene, polyvinylchloride, poly(1-butene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methylacrylate), poly(ethyl acrylate), poly(caprolactam), poly(hexamethyleneadipamide), poly(ethylene terephthalate), vinyl chloride-vinyl acetate copolymers, styrene-butadiene copolymers, styrene-isoprene copolymers, cellulose, cellulose acetate, cellulose propionate, cellulose acetate butyrate, ethyl cellulose, methyl cellulose, hydroxyethyl cellulose, and hydroxypropyl cellulose.

3. The process of claim 1 wherein R is at least one saturated or unsaturated aliphatic group which is linear, branched, or cyclic.

4. The process of claim 3 wherein X is at least one group selected from the group consisting of acyl, aroyl, aldehyde, ether, acyl halide, arylazo, quinone, sulfide, disulfide, thiol, halogen, phenyl, substituted phenyl, naphthyl, substituted naphthyl, heterocyclics, and substituted heterocyclics.

5. The process of claim 1 wherein the source of free radicals is selected from the group consisting of an organic peroxide, hydroperoxide, and azo compound.

6. The process of claim 5 wherein there is reacted a composition containing about 60 to about 98% by weight of the polymeric material, about 1 to about 30% by weight of the reagent R-X, and about 1 to about 20% by weight of the free-radical source.

7. The process of claim 1 wherein a composition containing about 60 to about 99% by weight of the polymeric material, about 1 to about 30% by weight of the reagent R-X and an effective amount up to 10% by weight of a photosensitizing additive are subjected to actinic radiation.

8. The process of claim 1 wherein a composition containing about 70 to about 99% by weight of the polymeric material and about 1 to about 30% by weight of the reagent R-X are subjected to ionizing radiation.

9. The process of claim 1 wherein R-X is a compound selected from the group consisting of ketones, aldehydes, sulfur compounds, nitro compounds, halogenated compounds, ethers, amines and aromatic compounds.

10. The process of claim 9 wherein said ketones are selected from the group consisting of laurophenone, n-decanophenone, di-n-heptyl ketone, 2-dodecanone, and 2-octadecanone.

11. The process of claim 9 wherein said aldehydes are selected from the group consisting of lauraldehyde, undecylenic aldehyde, and p-n-octyloxybenzaldehyde.

12. The process of claim 9 wherein said sulfur compounds are selected from the group consisting of n-decyl mercaptan, lauryl mercaptan, stearyl mercaptan, dilauryl sulfide, dilauryl disulfide, distearyl disulfide, and di-n-octyl disulfide.

13. The process of claim 9 wherein said nitro compounds are selected from the group consisting of p-nitrophenyl caprylate and p-nitrophenyl laurate.

14. The process of claim 9 wherein said halogenated compounds are selected from the group consisting of lauryl bromide, lauryl chloride, stearyl bromide, stearyl chloride, oleoyl chloride, lauroyl chloride, stearoyl chloride, and dodecenyl chloride.

15. The process of claim 9 wherein said ethers are selected from the group consisting of cetyl vinyl ether, n-dodecyl phenyl ether, lauryl vinyl ether, and dilauryl ether.

16. The process of claim 9 wherein said amines are selected from the group consisting of stearyl diphenylamine, and N-stearylmorpholine.

17. The process of claim 9 wherein said aromatic compounds are selected from the group consisting of 1-decylnaphthalene, n-dodecylbenzene, n-decylbenzene, and 1octylnaphthalene.

18. The process of claim 1 wherein said degradable polymeric composition is exposed to at least one natural environmental condition including sunlight, heat, oxygen, moisture or microorganisms.

* * * * *